(12) United States Patent
Buzinover et al.

(10) Patent No.: US 12,401,844 B2
(45) Date of Patent: *Aug. 26, 2025

(54) VIDEO PROCESSING METHOD, VIDEO PROCESSING APPARATUS, AND NON-TRANSITORY COMPUTER-READABLE STORAGE MEDIUM

(71) Applicant: LEMON INC., Grand Cayman (KY)

(72) Inventors: Michael Buzinover, Culver City, CA (US); Shen Li, Beijing (CN); Chenman Zhou, Beijing (CN); Xuelun Fu, Beijing (CN)

(73) Assignee: LEMON INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,217

(22) Filed: Apr. 23, 2024

(65) Prior Publication Data

US 2024/0276057 A1 Aug. 15, 2024

Related U.S. Application Data

(63) Continuation of application No. 17/723,881, filed on Apr. 19, 2022, now Pat. No. 11,991,410.

(30) Foreign Application Priority Data

Oct. 28, 2021 (CN) .......................... 202111266487.4

(51) Int. Cl.
*H04N 21/431* (2011.01)
*G11B 27/10* (2006.01)
(Continued)

(52) U.S. Cl.
CPC ....... *H04N 21/4316* (2013.01); *G11B 27/105* (2013.01); *G11B 27/34* (2013.01); *H04N 21/2743* (2013.01)

(58) Field of Classification Search
CPC .......... H04N 21/4316; H04N 21/2743; G11B 27/105; G11B 27/37
See application file for complete search history.

(56) References Cited

U.S. PATENT DOCUMENTS 9,583,142 B1 2/2017 Zhu et al.
2018/0349513 A1* 12/2018 Hornkvist ......... G06F 16/24578
(Continued)

FOREIGN PATENT DOCUMENTS

CN 108989691 A 12/2018
CN 305210712 S 6/2019
(Continued)

OTHER PUBLICATIONS

International Search Report mailed May 16, 2023 in International Application No. PCT/SG2022/050744, with English translation (7 pages).

(Continued)

*Primary Examiner* — Yassin Alata
(74) *Attorney, Agent, or Firm* — Faegre Drinker Biddle & Reath LLP

(57) ABSTRACT

This disclosure relates to a video processing method, a video processing apparatus, and a non-transitory computer-readable storage medium. The video processing method includes: providing an interactive interface comprising a specific shooting mode for a user in response to a shooting request of the user; presenting a plurality of recommended videos to the user on a specific shooting mode interface in response to the user's selection of the specific shooting mode on the interactive interface; and performing a specific shooting in response to a request inputted by the user associated with one of the plurality of recommended videos from specific shooting, wherein the specific shooting comprises acquiring a video and fusing the acquired video and the one recommended video or a related source video into a combined video.

17 Claims, 10 Drawing Sheets

(51) Int. Cl.
*G11B 27/34* (2006.01)
*H04N 21/2743* (2011.01)

(56) References Cited

U.S. PATENT DOCUMENTS

| | | | |
|---|---|---|---|
| 2021/0035541 A1* | 2/2021 | Pande | G10H 1/361 |
| 2021/0168473 A1 | 6/2021 | Li | |
| 2022/0237229 A1* | 7/2022 | Wong | G06F 16/90332 |
| 2022/0292875 A1* | 9/2022 | Zhang | H04N 21/4788 |
| 2022/0329895 A1* | 10/2022 | Zhang | H04N 21/25875 |
| 2023/0104764 A1 | 4/2023 | Li | |
| 2023/0139768 A1 | 5/2023 | Buzinover et al. | |

FOREIGN PATENT DOCUMENTS

| | | |
|---|---|---|
| CN | 109982130 A | 7/2019 |
| CN | 111163274 A | 5/2020 |
| CN | 111408136 A | 7/2020 |
| CN | 111629151 A | 9/2020 |
| CN | 111767430 A | 10/2020 |
| CN | 111408136 B | 2/2021 |
| CN | 113271478 A | 8/2021 |
| CN | 113395588 A | 9/2021 |
| CN | 113553509 A | 10/2021 |
| JP | 2006509399 A | 3/2006 |
| JP | 2012073379 A | 4/2012 |
| JP | 7585556 B2 | 11/2024 |

OTHER PUBLICATIONS

Decision to Grant a Patent for Japanese Application No. 2024-525661, mailed Oct. 8, 2024, 5 pages.
Office action received from Chinese patent application No. 202111266487.4 mailed on Jan. 26, 2025, 14 pages (7 pages English Translation and 7 pages Original Copy).
Communication pursuant to Rules 70(2) and 70a(2) EPC for European Application No. 22887805.4, mailed Feb. 11, 2025, 1 page.
Extended European Search Report for European Application No. 22887805.4, mailed Jan. 23, 2025, 9 pages.

* cited by examiner

| | |
|---|---|
| video 1 (PN1) | video 2 (PN2) |
| video 3 (PN3) | video 4 (PN4) |

X  Recommended Videos

Specific Shooting    Video    Template

Fig. 3A

VIDEO PROCESSING METHOD, VIDEO PROCESSING APPARATUS, AND NON-TRANSITORY COMPUTER-READABLE STORAGE MEDIUM

CROSS-REFERENCE TO RELATED APPLICATIONS

This application a continuation application of a U.S. application Ser. No. 17/723,881, which is claims priority to Chinese Patent Application No. 202111266487.4, entitled "VIDEO PROCESSING METHOD, VIDEO PROCESSING APPARATUS, AND COMPUTER-READABLE STORAGE MEDIUM", and filed on Oct. 28, 2021. The entire disclosure of the prior applications are hereby incorporated by reference in their entireties.

TECHNICAL FIELD

The present disclosure relates to the field of computer technologies, and in particular, to a video processing method, a video processing apparatus, and a non-transitory computer-readable storage medium.

BACKGROUND

A social network can provide, according to user's input, various services, such as photo or video sharing, messaging, etc., to facilitate social interactions between users.

By using interactions with the social network, the user can upload digital media to a system for browsing by others. The digital media can comprise image, video, audio, text, and the like. For example, the user can post a self-created video onto the social network. Other users on the social network can interact by means of likes, comments, forwarding and the like when viewing interested videos, and can also interact by means of videos from specific shooting.

With the user's increasing dependence on the social network, the user has higher and higher experience requirements for the social network.

SUMMARY

According to some embodiments of the present disclosure, there is provided a video processing method, comprising:
  providing an interactive interface comprising a specific shooting mode for a user, in response to a shooting request of the user;
  presenting a plurality of recommended videos from specific shooting to the user on a specific shooting mode interface, in response to the user's selection of the specific shooting mode on the interactive interface; and
  performing a specific shooting in response to a specific shooting request inputted by the user associated with one of the plurality of recommended videos from specific shooting, wherein the specific shooting comprises acquiring a video and fusing the acquired video and the one recommended video or a related source video into a combined video.

According to other embodiments of the present disclosure, there is provided a video processing apparatus, comprising:
  a display configured to
    provide an interactive interface comprising a specific shooting mode for a user, in response to a shooting request of the user, and
    present a plurality of recommended videos to the user on a specific shooting mode interface, in response to the user's selection of the specific shooting mode on the interactive interface; and
  a processor configured to perform a specific shooting in response to a specific shooting request inputted by the user associated with one of the plurality of recommended videos from specific shooting, wherein the specific shooting comprises acquiring a video and fusing the acquired video and the one recommended video or a related source video into a combined video.

According to still other embodiments of the present disclosure, there is provided a video processing apparatus, comprising:
  a memory; and
    a processor coupled to the memory, the processor being configured to perform, based on instructions stored in the memory, one or more steps of the video processing method of any of the embodiments according to the present disclosure.

According to further embodiments of the present disclosure, there is provided a non-transitory computer-readable storage medium having thereon stored a computer program which, when executed by a processor, performs the video processing method of any of the embodiments according to the present disclosure.

The "SUMMARY" is provided to introduce concepts in a simplified form, which will be described in detail below in the following "DETAILED DESCRIPTION OF THE DRAWINGS". The "SUMMARY" is not intended to identify key features or essential features of the claimed technical solutions, nor is it intended to limit the scope of the claimed technical solutions.

Other features, aspects, and advantages of the present disclosure will become apparent through the following detailed description of exemplary embodiments thereof, which is made with reference to the accompanying drawings.

BRIEF DESCRIPTION OF THE DRAWINGS

Preferred embodiments of the present disclosure are described below with reference to the accompanying drawings. The accompanying drawings described herein are intended to provide a further understanding of the present disclosure. The accompanying drawings, together with the following detailed description, are incorporated in and form a part of this specification, and serve to explain the present disclosure. It should be understood that the drawings in the following description relate only to some embodiments of the present disclosure, rather than limiting the present disclosure. In the drawings:

FIG. 3A illustrates a schematic diagram of a specific shooting mode interface according to some embodiments of the present disclosure;

Figure 1:
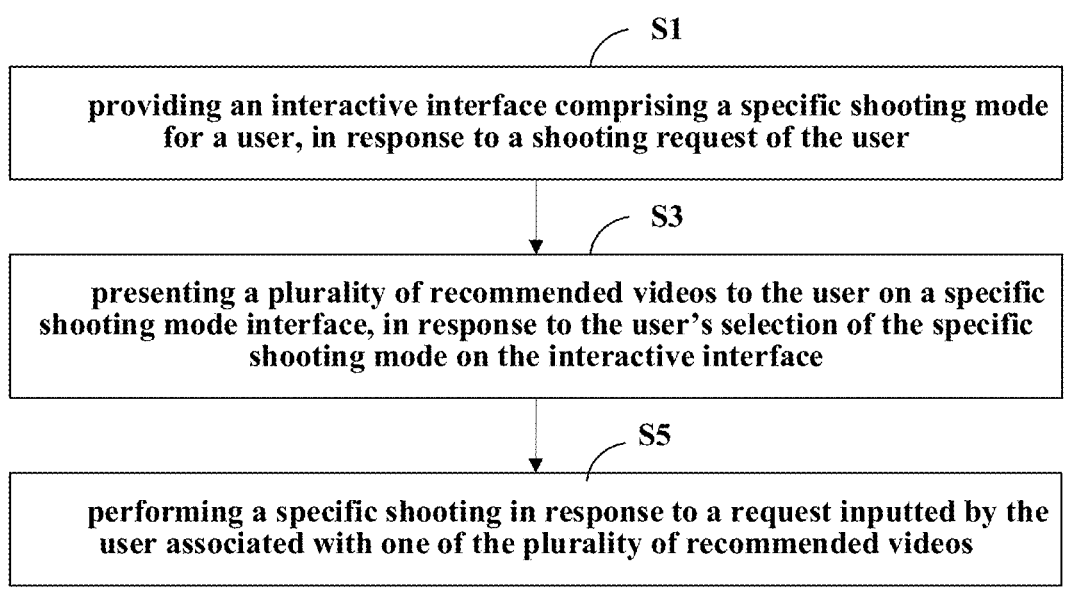
FIG. 1 illustrates a flow diagram of a video processing method according to some embodiments of the present disclosure.

It should be understood that sizes of various components shown in the drawings are not necessarily drawn to an actual scale for ease of illustration. Identical or similar reference numbers are used throughout the drawings to refer to identical or similar components. Thus, once a certain item is defined in one drawing, it may not be further discussed in subsequent drawings.

DETAILED DESCRIPTION

The technical solutions in the embodiments of the present disclosure will be described clearly and completely in conjunction with the drawings in the embodiments of the present disclosure, but it is obvious that the embodiments described are only some of the embodiments of the present disclosure, not all of the embodiments. The following description of the embodiments is merely illustrative in nature and is in no way intended to limit this disclosure, its application, or uses. It should be understood that the present disclosure can be implemented in various forms and should not be construed as limited to the embodiments set forth herein.

It should be understood that various steps recited in method embodiments of the present disclosure can be performed in a different order, and/or performed in parallel. Moreover, the method embodiments can comprise additional steps and/or omit performing the illustrated steps. The scope of the present disclosure is not limited in this respect. Unless specifically stated otherwise, relative arrangements of components and steps, numerical expressions, and numerical values set forth in these embodiments should be construed as merely illustrative, and do not limit the scope of the present disclosure.

A term "comprise" and variations thereof used in this disclosure are intended to be an open-minded term that comprises at least subsequent elements/features, but do not exclude other elements/features, i.e., "comprising but not limited to". Furthermore, a term "include" and variations thereof used in this disclosure are intended to be an open-minded term that includes at least subsequent elements/features, but does not exclude other elements/features, i.e., "including but not limited to". Thus, "comprise" is synonymous with "include". A term "based on" means "based at least in part on".

"One embodiment", "some embodiments", or "an embodiment" termed throughout this specification means that a specific feature, structure, or characteristic described in conjunction with the embodiment is included in at least one embodiment of the present invention. For example, the term "one embodiment" means "at least one embodiment"; the term "another embodiment" means "at least one other embodiment"; the term "some embodiments" means "at least some embodiments". Moreover, the phrases "in one embodiment", "in some embodiments", or "in an embodiment" appearing in various places throughout this specification do not necessarily all refer to a same embodiment, but can refer to the same embodiment.

It should be noted that notions of "first", "second", and the like mentioned in the present disclosure are only used for distinguishing different devices, modules or units, and are not used for limiting the order or interdependence of functions performed by these devices, modules or units. Unless otherwise specified, the notions of "first", "second", and the like, are not intended to imply that objects so described must be in a given order in time, space, rank, or in any other way.

It should be noted that modifiers of "one" and "more" mentioned in this disclosure are intended to be illustrative rather than restrictive, and those skilled in the art should appreciate that they should be understood as "one or more" unless otherwise clearly indicated in the context.

Names of messages or information exchanged between a plurality of devices in the embodiments of the present disclosure are for illustrative purposes only, and are not intended to limit the scope of these messages or information.

Embodiments of the present disclosure will be described in detail below in conjunction with the accompanying drawings, but the present disclosure is not limited to these specific embodiments. These specific embodiments can be combined with each other below, and identical or similar concepts or processes may not be repeated in some embodiments. Furthermore, in one or more embodiments, the specific feature, structure, or characteristic can be combined in any suitable manner that would be understood by one of ordinary skill in the art from this disclosure.

It should be understood that how an image or video to be applied/processed is obtained is also not limited in the present disclosure. In one embodiment of the present disclosure, the image or video can be acquired from a storage device, for example, an internal memory or an external storage device, and in another embodiment of the present disclosure, the image or video can be taken by a camera assembly. It should be noted that in the context of this specification, a type of the image or video is not specifically limited. Furthermore, the image or video can be a source image or video obtained by a camera device, or an image or video obtained by particularly processing the source image or video, such as preliminary filtering, antialiasing, color adjustment, contrast adjustment, normalization, and the like. It should be noted that the preprocessing operation can also comprise other types of preprocessing operations known in the art, which will not be repeated herein.

With the user's increasing dependence on the social network, the user has higher and higher experience requirements for the social network. To further enhance the experience on the social network, a new mode is created in a shooting request, for example, alongside camera, template, live streaming, with which the user can quickly discover a content that is easy to collaborate with, for example a popular video from specific shooting.

FIG. 1 illustrates a flow diagram of a video processing method according to some embodiments of the present disclosure.

As shown in FIG. 1, the video processing method comprises: step S1, providing an interactive interface comprising a specific shooting mode for a user, in response to a shooting request of the user; step S3, presenting a plurality of recommended videos to the user on a specific shooting mode interface, in response to the user's selection of the specific shooting mode on the interactive interface; and step S5, performing a specific shooting in response to a specific shooting request inputted by the user associated with one of the plurality of recommended videos from specific shooting, wherein the specific shooting comprises acquiring a video and fusing the acquired video and the one recommended video or a related source video into a combined video.

In the combined video, which is obtained from the specific shooting with the source video of the recommended video, the shot video and the source video are concurrently presented. If the combined video is obtained from the specific shooting with the recommended video, the shot video and the recommended video are concurrently presented in the combined video.

In the step S1, the interactive interface can be provided in response to the user's selection of a camera option on a display interface of a terminal. In the related art, an entry to the specific shooting is provided in a sharing interface, and according to an embodiment of the present disclosure, the entry to the specific shooting is provided in a shooting interface, so that the user is capable of finding the specific shooting interface more easily.

Figure 2:
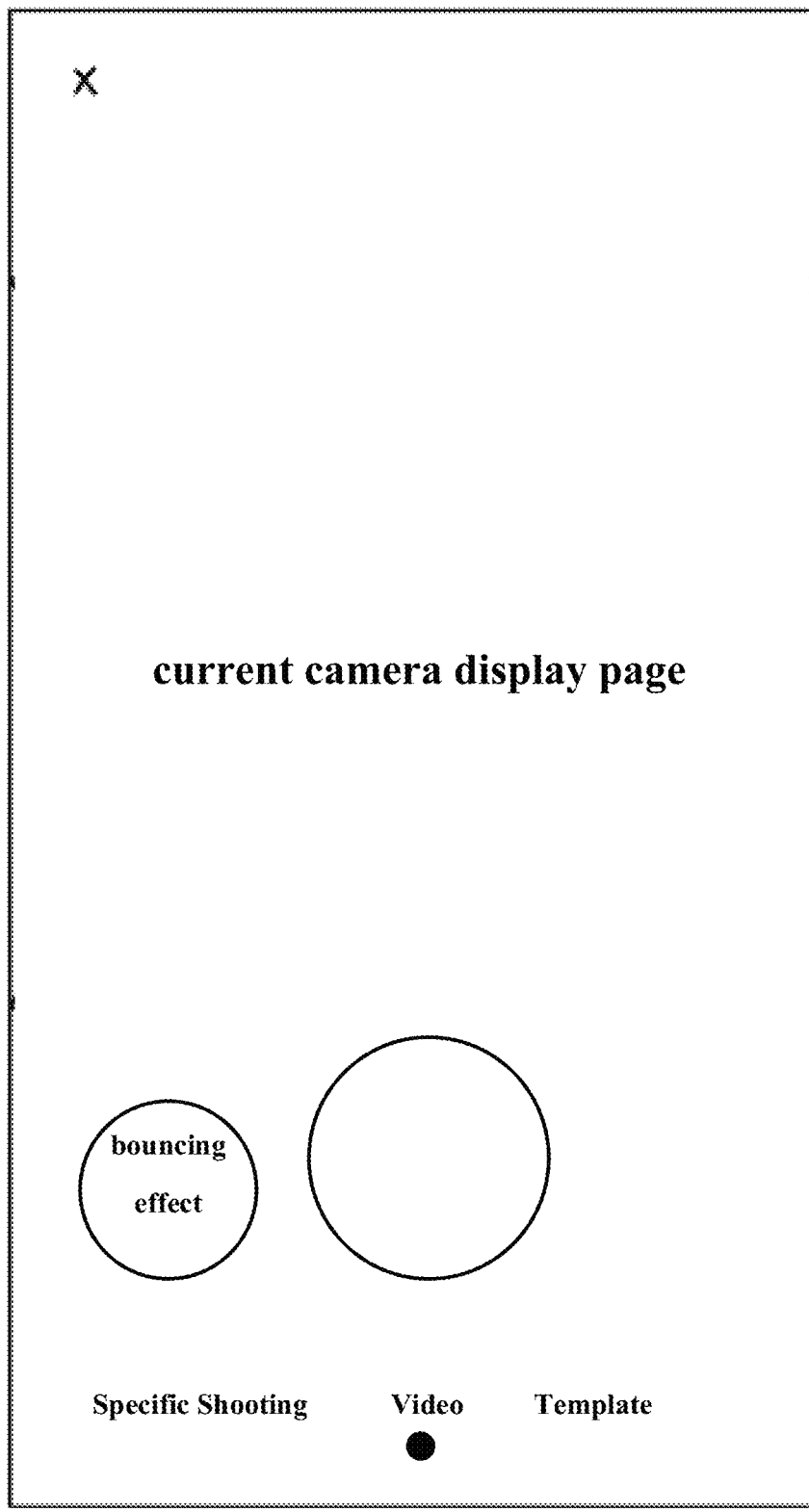
FIG. 2 illustrates a schematic diagram of an interactive interface according to some embodiments of the present disclosure.

FIG. 2 illustrates a schematic diagram of an interactive interface according to some embodiments of the present disclosure.

FIG. 2 illustrates a current camera display page. FIG. 2 also illustrates options of Specific shooting, Video, Template, etc. in a bottom carousel of the interactive interface. The Specific shooting mode can be provided on the left of the Normal video shooting mode.

Next, in the step S3, when the user scrolls on the interactive interface to the Specific shooting mode in the bottom carousel, or selects the Specific shooting mode, the user selects the specific shooting mode. Of course, the user can also scroll to other options such as the Normal video shooting mode or Template option.

After the user displays the specific shooting mode, the specific shooting mode interface can be presented to the user, and a plurality of recommended videos from specific shooting are presented to the user through the specific shooting mode interface. Such a page can also be referred to as a "specific shooting discovery page".

The specific shooting mode interface where the plurality of recommended videos are presented to the user can adopt different manners as needed. The thumbnails of the plurality of recommended videos can be concurrently presented to the user. The plurality of recommended videos can also be sequentially presented to the user.

FIG. 3A illustrates a schematic diagram of a specific shooting mode interface according to some embodiments of the present disclosure.

As shown in FIG. 3A, the specific shooting mode interface is a user interface where "Recommended videos" are displayed in two columns. For example, on a user interface in a form of 2×2 grids, thumbnails of 4 recommended videos are presented to the user. The user is allowed to scroll the videos for playing, to discover more contents from specific shooting. In a top-left corner of the user interface shown in FIG. 3A, there is an exit to return to a screen outside the camera, and the Normal video shooting mode is still shown at the bottom thereof.

For example, when the user just displays the specific shooting mode interface, thumbnails of 1st to 4th recommended videos are presented to the user; and in response to a gesture of the user, such as swipe-up, more videos are presented to the user, for example, thumbnails of 5th to 8th recommended videos from specific shooting, 9th to 12th recommended videos from specific shooting, and more recommended videos from specific shooting, are sequentially presented to the user. Of course, according to a size of the display screen of the user terminal, thumbnails of more recommended videos from specific shooting, such as 6, 8, and so on, can also be presented per screen. A thumbnail size can be adjusted according to an aspect ratio of a content from specific shooting. For example, a thumbnail can be set to be fixed in width and variable in height. A thumbnail of each video can be enlarged to the full screen. The presentation of the recommended videos in the thumbnail form can facilitate the user to discover an interested video more quickly.

To enhance the user experience, each tab is preloaded with thumbnails of a plurality of videos from specific shooting, for example, 20 thumbnails in 10 rows. When the user's operation scrolls to the bottom of the user interface, more thumbnails of videos are loaded.

In some embodiments, for each recommended video from specific shooting, a tag of its corresponding publish number is displayed on its thumbnail. Tagging the publish number on the thumbnail of each recommended video can facilitate the user to discover popular video contents.

Figure 3B:
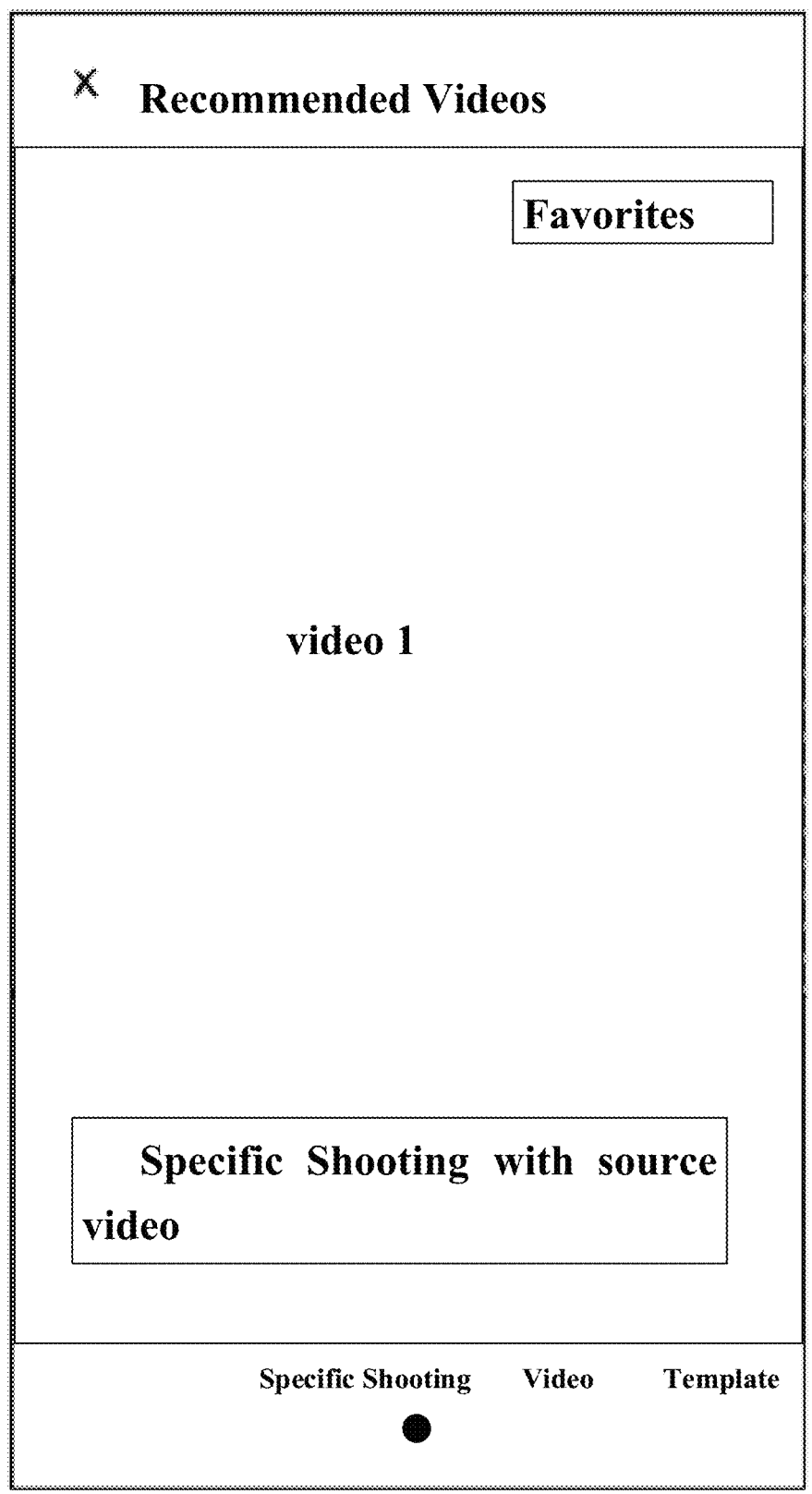
FIG. 3B illustrates a schematic diagram of a specific shooting mode interface according to other embodiments of the present disclosure.

FIG. 3B illustrates a schematic diagram of a specific shooting mode interface according to other embodiments of the present disclosure.

As shown in FIG. 3B, the specific shooting mode interface is a user interface where each of the "Recommended videos from specific shooting" is displayed in full screen. The plurality of recommended videos are sequentially presented to the user in the full-screen form. For example, when the user just displays the specific shooting mode interface, the 1st recommended video is presented to the user. The user can discover more contents by scrolling the video for playing. That is, in response to the user's gesture, for example, swipe-up, the 2nd recommended video from specific shooting, the 3rd recommended video from specific shooting, and more recommended videos are sequentially presented to the user. The presentation of the recommended videos in the full-screen form can provide the user with an immersive experience.

It has been described above in detail that the plurality of recommended videos can be presented to the user through the different user interfaces, and it will be described below which videos are presented to the user as the recommended videos from specific shooting.

In some embodiments, the presenting a plurality of recommended videos to the user through the specific shooting mode interface comprises: ranking videos in a database according to a user behavior; and presenting a plurality of recommended videos ranked on top to the user according to the ranking result.

The user behavior can comprise: a number of times a video is viewed (also called Video View, VV), a related publish number, times subjected to specific shooting, creation time, creation place, and the like. The related publish number can be characterized by a ratio of the corresponding publish number to the Video View (Publish/VV)

In some embodiments, the video in the database can be limited to the video with a Video View greater than a threshold. For example, the threshold can be determined according to statistics of a number of videos and Video View in different regions, for example, the threshold is set to 30 thousands for most countries or regions. In this way, regardless of whether the videos in the database are ranked according to the Video View or according to the related publish number or other user behaviors, it is beneficial for discovering an interested video more efficiently by the user.

In other embodiments, the creation time of the video in the database can be limited to within a specified period of time. For example, the creation time of the video in the database can be limited to no more than 7 days. This can ensure that the videos in the database are refreshed continuously, which is beneficial for discovering more popular videos by the user, to improve the user experience.

In addition, in order to step up the protection for the user's privacy, only a video with a status of "visible to everyone" and allowing everyone to perform a specific shooting with can be taken as a recommended video from specific shooting. For example, privacy settings of the video in the database meet: a status being "visible to everyone", and allowing everyone to perform a specific shooting with.

How to rank the videos in the database according to the user behavior will be described in detail below in conjunction with the specific user behavior.

The videos can be ranked according to the related publish number or according to a Video View. For example, the greater the related publish number or the greater the Video View, the higher the rank.

Original videos can also be ranked according to times subjected to specific shooting. For example, the more the times subjected to specific shooting, the higher the rank. Then, in some embodiments, the original videos as the recommended videos according to a ranking result are presented.

In other embodiments, for each original video ranked on top, one or more videos from specific shooting with a number of times the videos are played greater than a threshold among videos from specific shooting corresponding to the original video to the user are presented. For example, one or more videos with a maximum Video View among videos corresponding to the original video is presented to the user. That is to say, a plurality of suggested videos corresponding to a plurality of original videos ranked on top are presented to the user according to the ranking result, wherein each suggested video is a video from specific shooting with a maximum video view in videos from specific shooting with a corresponding original video. Here, the video from specific shooting with the maximum Video View among the videos from specific shooting can be one or more videos from specific shooting.

To make it easier for users to discover recently popular videos from specific shooting, the creation time is also considered when ranking the videos in the database. In addition, since user behaviors in different countries or regions would be different, the creation place is also considered when the videos in the database are ranked. Therefore, in order to discover more popular local videos from specific shooting, the videos can be ranked according to at least one of the creation time or creation place.

For example, the more recent the creation time of the video, that is, the fewer the creation days, the higher its rank. In some embodiments, different weights can be set according to different importance of the creation time in ranking, to better match the user's needs.

In some embodiments, when the plurality of recommended videos ranked on top are presented to the user according to the ranking result, only recommended videos ranked on top within each unit time can be presented according to the creation time. For example, for each of the above ranking logics, only top (for example, top 200) videos per day can be presented according to the creation time. In this way, the user can be made to more efficiently discover interested popular videos.

After browsing the plurality of recommended videos or thumbnails, the user can select a video for specific shooting with, and input a specific shooting request.

FIGS. 4A to 4D illustrate schematic diagrams of inputting a specific shooting request to perform a specific shooting according to some embodiments of the present disclosure.

Figure 4A:
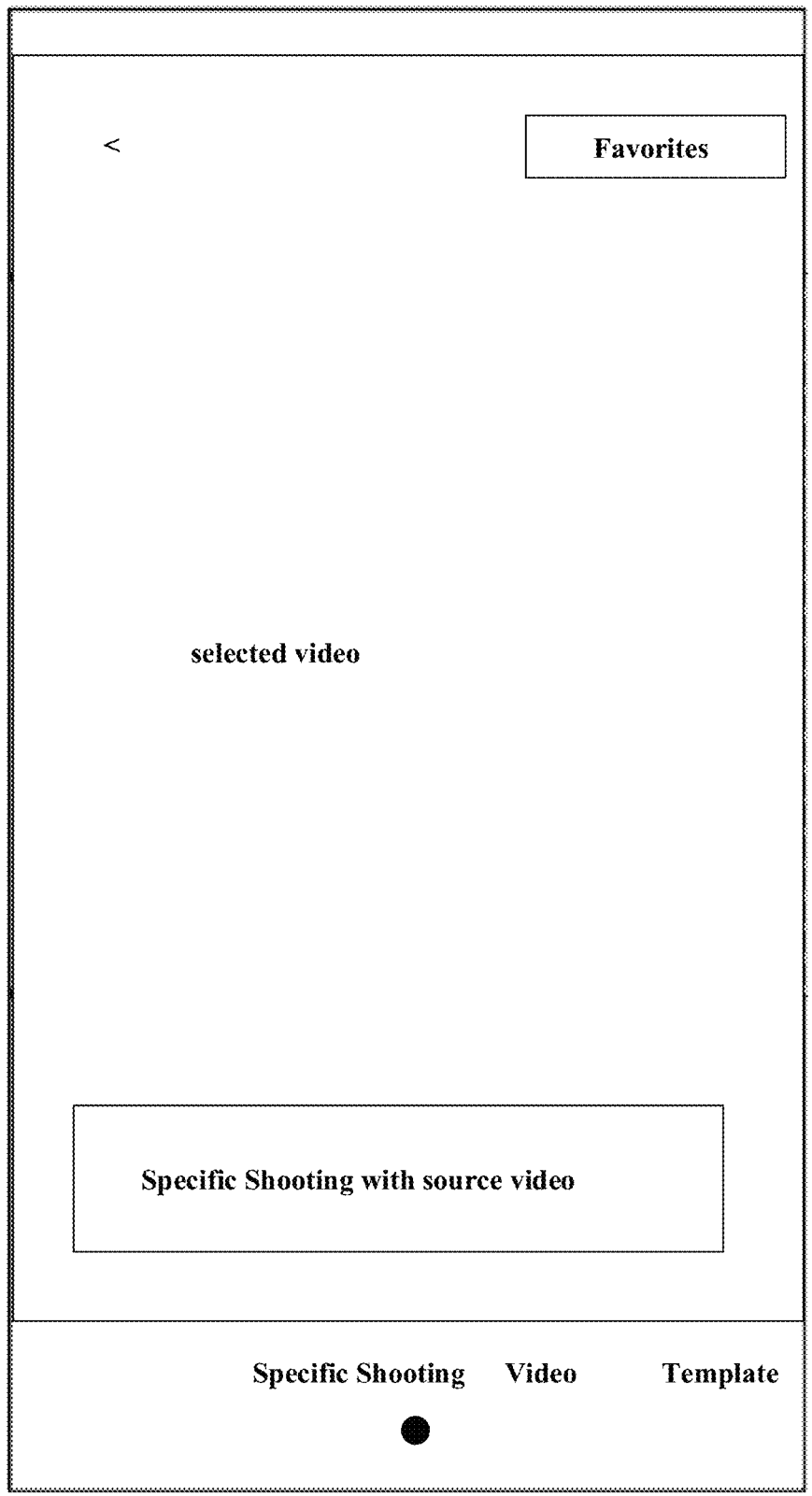
FIGS. 4A to 4D illustrate schematic diagrams of inputting a specific shooting request to perform a specific shooting according to some embodiments of the present disclosure.
Figure 4B:
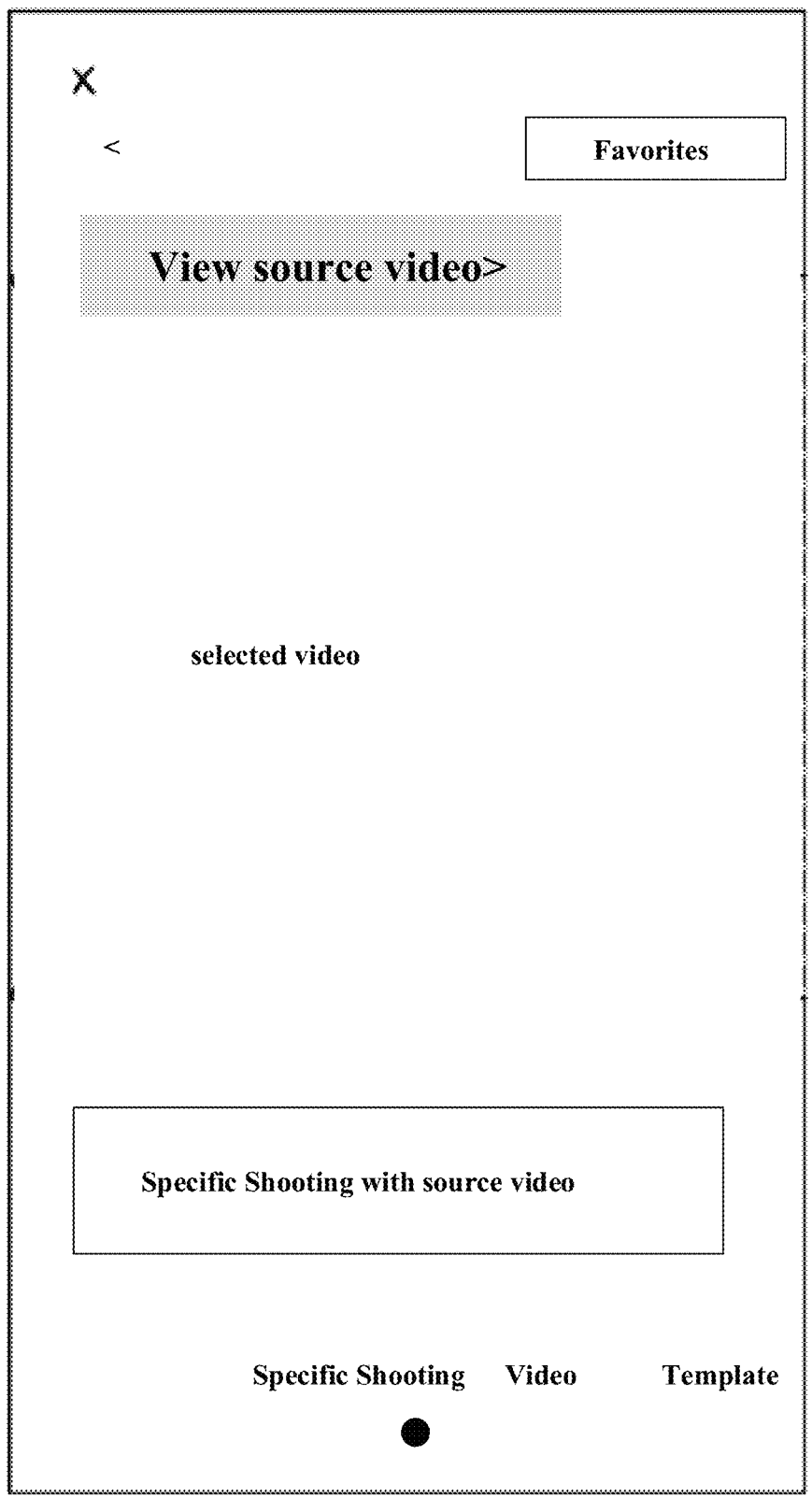
Figure 4C:
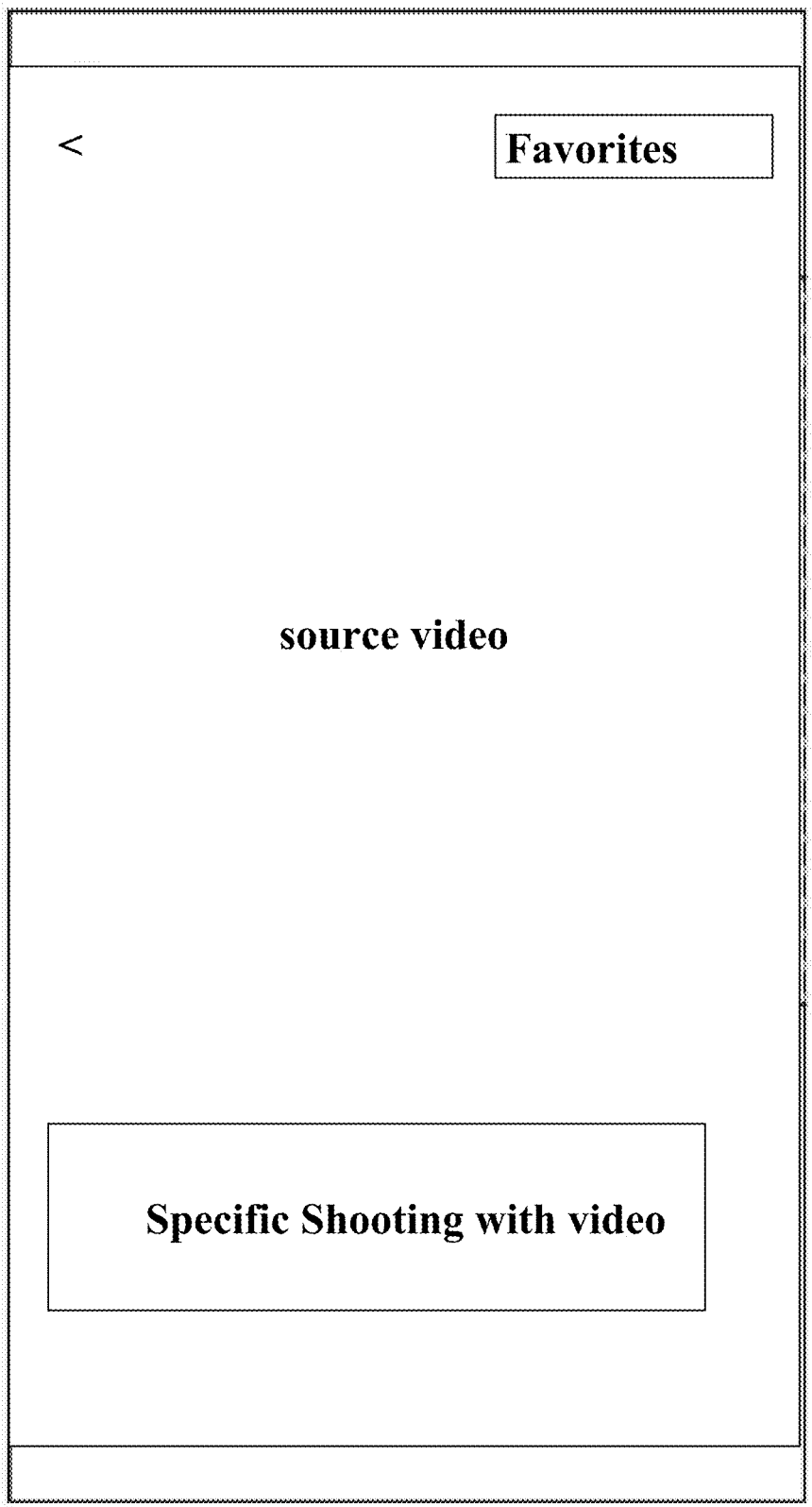
Figure 4D:
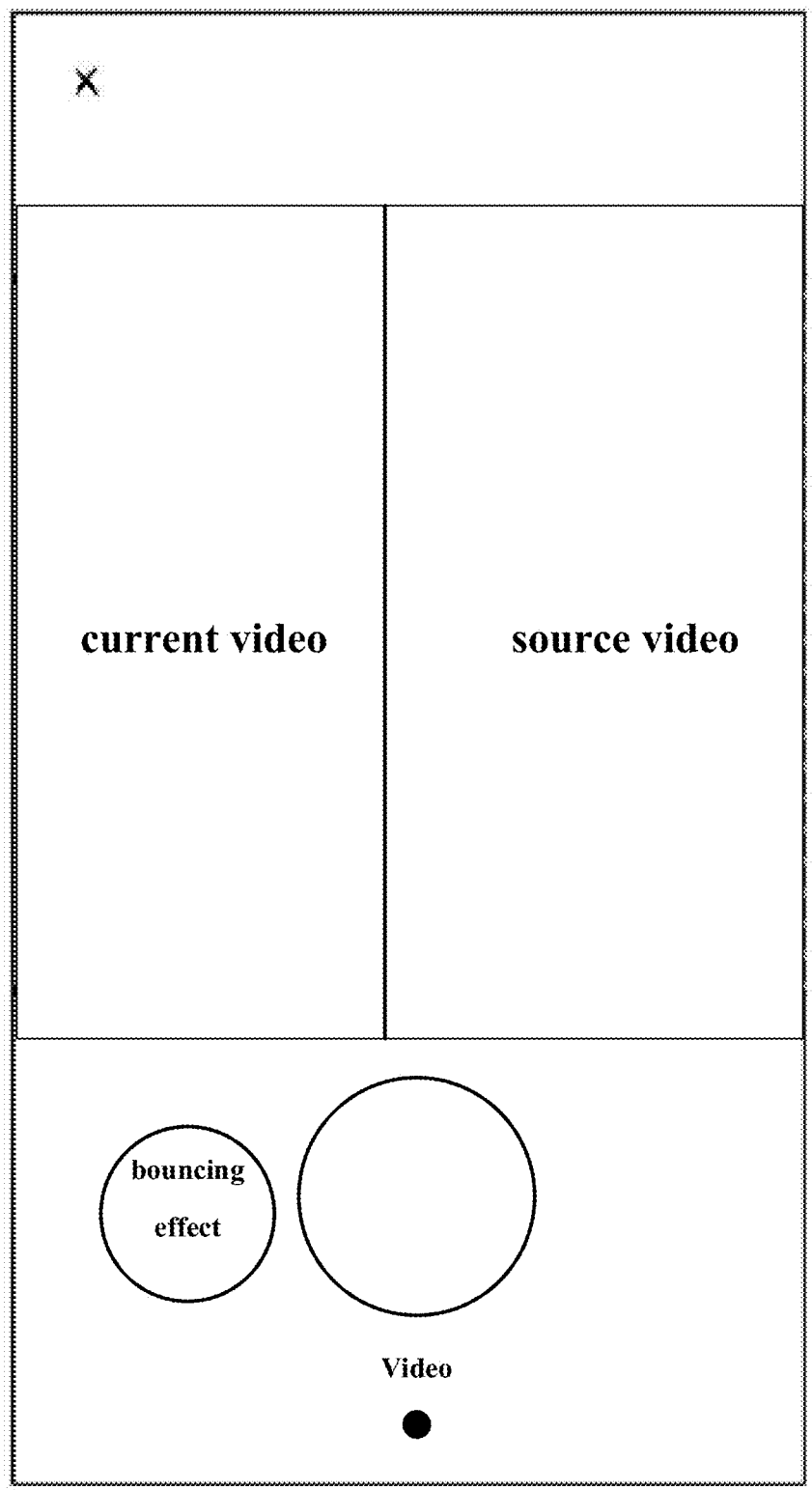

For the user interface of the recommended videos in the thumbnail form, when the user selects a certain recommended video to play, a specific shooting mode video player plays the video selected by the user, such as a page shown in FIG. 4A. The user clicks on the video on the page shown in FIG. 4A, and a tooltip of "View source video" will appear, such as a page shown in FIG. 4B. After clicking on the tooltip, the user displays a display page of the source video, as shown in FIG. 4C. Options of Return and "Perform a specific shooting with video" are provided on the source video of FIG. 4C. The user selects the "Perform a specific shooting with video" option, i.e., inputs a specific shooting request, and can perform a perform a specific shooting with the source video. A display page for performing the specific shooting is shown in FIG. 4D.

As shown in FIGS. 4A to 4D, the user selects the recommended video from specific shooting, and inputs the specific shooting request through the display page of the corresponding source video to perform the perform a specific shooting with the source video. That is, in the step S5, the perform a specific shooting with the source video can be performed in response to the specific shooting request inputted by the user based on the source video corresponding to the selected recommended video from specific shooting.

In other embodiments, the user can also directly input the specific shooting request through a display page of the selected recommended video from specific shooting. As shown in FIG. 4A, on the display page of the recommended video selected by the user, a "Perform a specific shooting with source video" option is provided. The user can directly display the perform a specific shooting with the source video by selecting the "Perform a specific shooting with source video" option, and a display page for performing the specific shooting is also shown in FIG. 4D. That is, in the step S5, the perform a specific shooting with the source video can also be performed in response to the specific shooting request inputted by the user based on the selected recommended video from specific shooting.

On the page shown in FIG. 4A, the "Perform a specific shooting with source video" option can be displayed, but the display of other metadata is limited.

For the user interface of the recommended video in the full-screen form, when the user browses any recommended video from specific shooting, the specific shooting mode video player can play the video from specific shooting, such as the page shown in FIG. 3B, which is similar to the page shown in FIG. 4A. Accordingly, the user clicks on the video on the page shown in FIG. 3B, and then the tooltip of "View source video" will appear, which is similar to the page shown in FIG. 4B. After clicking on the tooltip, the user displays the display page of the source video, as shown in FIG. 4C. The options of Return and "Perform a specific shooting with video" are provided on the source video of FIG. 4C. The user selects the "Perform a specific shooting with video" option, i.e., inputs the specific shooting request, and can perform the perform a specific shooting with the source video. The display page for performing the specific shooting is shown in FIG. 4D.

Of course, for the user interface of the recommended video in the full-screen form, the user can also, directly through the display page of the selected recommended video from specific shooting, input the specific shooting request. Similar to the user-selected display page of the recommended video as shown in FIG. 4A, the "Perform a specific shooting with source video" option is also provided on the page shown in FIG. 3B. The user can directly display the perform a specific shooting with the source video by selecting the "Perform a specific shooting with source video" option, and the display page for performing the specific shooting is also shown in FIG. 4D It has been described above in conjunction with FIGS. 3A to 3B and FIGS. 4A to 4D that in the step S5, the perform a specific shooting with the source video is performed in response to the specific shooting request inputted by the user associated with one of the plurality of recommended videos from specific shooting. In other embodiments, in the step S5, the perform a specific shooting with the selected recommended video can also be performed in response to the specific shooting request inputted by the user based on the selected recommended video from specific shooting.

In some embodiments, when the user first opens the specific shooting mode video player, a bouncing effect is animated on the display page to show the user that he/she can scroll to discover more contents. The user can scroll up and down to view a new video. If the user browses a first material, refresh is not allowed.

In addition, a Favorites option can also be provided on the pages of FIG. 3B and FIGS. 4A to 4C, for example, on top-right corners. The user can click on the Favorites option and add a viewed video into the favorites.

With the specific shooting mode video player, the user can be incentivized to use the viewed video in creation, or save it for later use, and the user can be enabled to get a better understanding of how to perform creation using the viewed video.

In the foregoing embodiments, the video processing method according to various embodiments of the present disclosure have been fully described. By the above video processing method, inspiration can be efficiently provided for potential creators, the efficiency of finding the videos by the user is improved, and the efficiency of discovering popular videos by the user is improved.

According to the embodiment of the present disclosure, there is also provided a video processing apparatus capable of implementing the video processing method.

Figure 5:
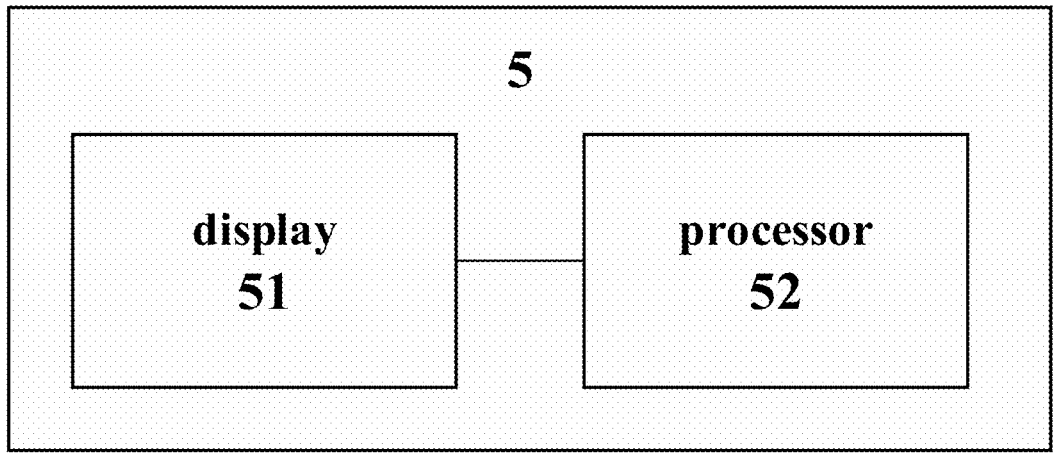
FIG. 5 illustrates a block diagram of a video processing apparatus according to some embodiments of the present disclosure.

FIG. 5 illustrates a block diagram of a video processing apparatus according to some embodiments of the present disclosure.

As shown in FIG. 5, a video processing apparatus 5 comprises a display 51 and a processor 52.

The display 51 is configured to: provide an interactive interface comprising a specific shooting mode for a user, in response to a shooting request of the user; and presenting a plurality of recommended videos to the user on a specific shooting mode interface, in response to the user's selection of the specific shooting mode on the interactive interface. For example, the display 51 can perform the aforementioned steps S1 and S3 under the control of the processor 52.

The processor 52 is configured to perform a specific shooting in response to a specific shooting request inputted by the user associated with one of the plurality of recommended videos from specific shooting. For example, the processor 52 performs the aforementioned step S5.

Furthermore, although not shown, the apparatus can also comprise a memory, which can have thereon stored various information generated in operations by the video processing apparatus and the units included in the video processing apparatus, programs and data for the operations, and the like. The memory can be a volatile memory and/or non-volatile memory. For example, the memory can include, but is not limited to, a random access memory (RAM), dynamic random access memory (DRAM), static random access memory (SRAM), read-only memory (ROM), flash memory. Of course, the memory can also be located outside the video processing apparatus.

Figure 6:
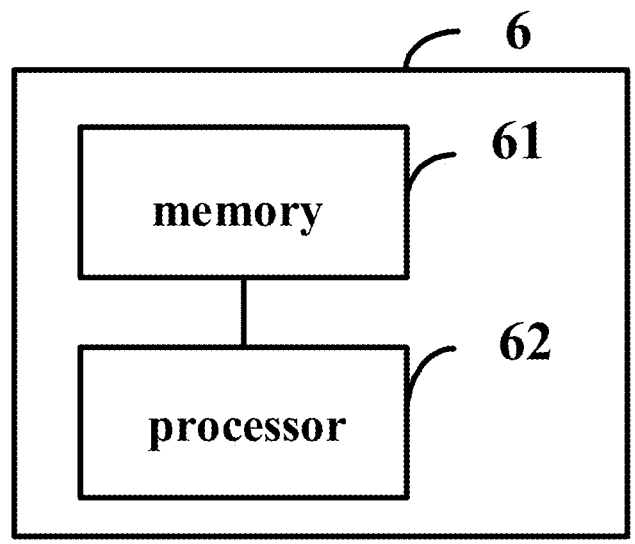
FIG. 6 illustrates a block diagram of a video processing apparatus according to other embodiments of the present disclosure.

FIG. 6 illustrates a block diagram of a video processing apparatus according to other embodiments of the present disclosure.

In some embodiments, a video processing apparatus 6 can be various types of devices, which can include, but are not limited to, for example, mobile terminals such as a mobile phone, a notebook computer, a digital broadcast receiver, a PDA (Personal Digital Assistant), a PAD (Tablet Personal Computer), a PMP (Portable Multimedia Player), a vehicle-mounted terminal (for example, a vehicle-mounted navigation terminal), and the like, and fixed terminals such as a digital TV, a desktop computer, and the like.

As shown in FIG. 6, the video processing apparatus 6 comprises: a memory 61 and a processor 62 coupled to the memory 61. It should be noted that the components of the video processing apparatus 6 shown in FIG. 6 are only exemplary and not restrictive, and the video processing apparatus 6 can also have other components according to the needs of practical application. The processor 62 can control the other components in the video processing apparatus 6 to perform a desired function.

In some embodiments, the memory 61 is configured to store one or more computer-readable instructions. The processor 62 is configured to run the computer-readable instructions and when the computer-readable instructions are run by the processor 62, implements one or more steps of the method according to any of the above embodiments. For example, the processor 62 is configured to run the computer-readable instructions and when the computer-readable instructions are run by the processor 62, perform a video processing method, comprising: providing an interactive interface comprising a specific shooting mode for a user, in response to a shooting request of the user; presenting a plurality of recommended videos to the user on a specific shooting mode interface, in response to the user's selection of the specific shooting mode on the interactive interface; and performing a specific shooting in response to a specific shooting request inputted by the user associated with one of the plurality of recommended videos from specific shooting. For specific implementations of each step of the method and related explanations, reference can be made to the above embodiments, which are not repeated herein.

For example, the processor 62 and the memory 61 can be in direct or indirect communication with each other. For example, the processor 62 and the memory 61 can communicate through a network. The network can comprise a wireless network, a wired network, and/or any combination of wireless and wired networks. The processor 62 and the memory 61 can also communicate with each other through a system bus, which is not limited in the present disclosure.

For example, the processor 62 can be embodied as various suitable processors, processing devices, and the like, such as a central processing unit (CPU), graphics processing unit (GPU), network processor (NP), and the like; but can also be a digital signal processor (DSP), application specific integrated circuit (ASIC), field programmable gate array (FPGA) or other programmable logic device, discrete gate or transistor logic, discrete hardware component. The central processing unit (CPU) can be an X86 or ARM architecture, etc. For example, the memory 61 can include any combination of various forms of non-transitory computer-readable storage media, such as a volatile memory and/or non-volatile memory. The memory 61 can include, for example, a system memory, which has thereon stored, for example, an operating system, application, boot loader, database, other program, and the like. Various applications and various data and the like can also be stored in the storage medium.

Figure 7:
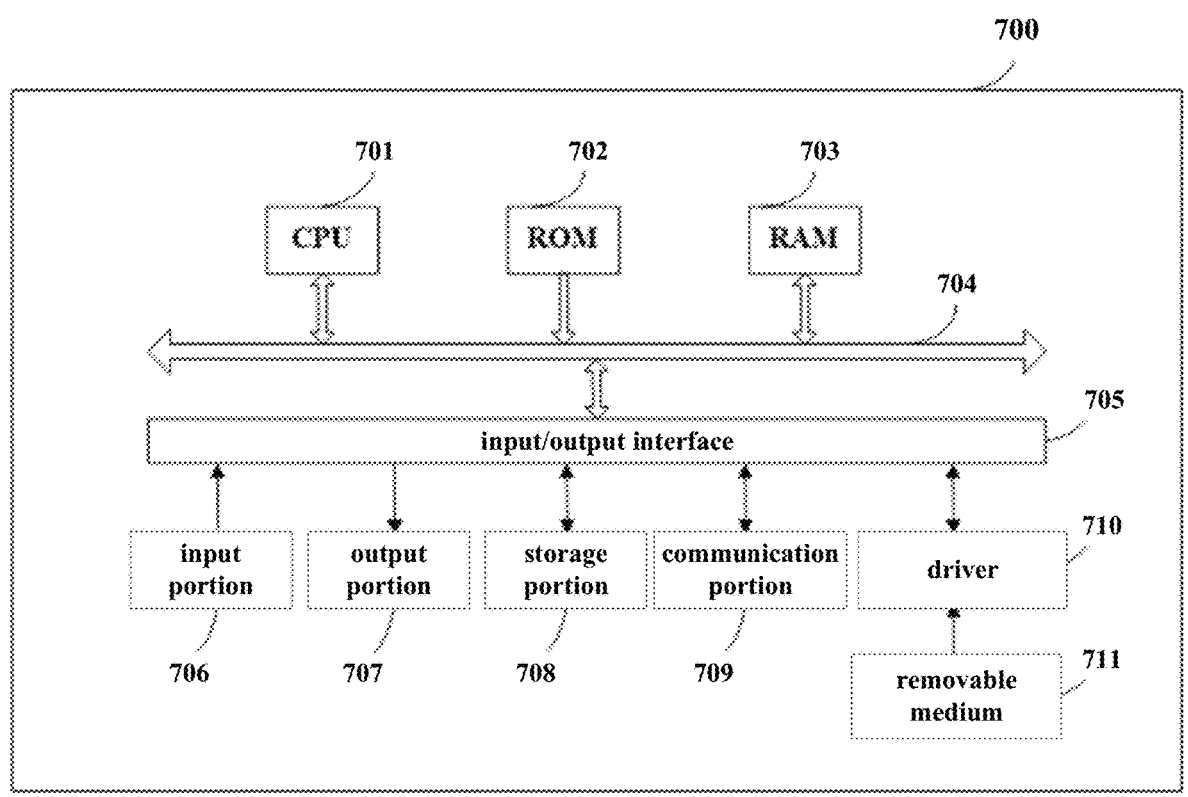
FIG. 7 illustrates a block diagram of an electronic device according to some embodiments of the present disclosure.

In addition, according to some embodiments of the present disclosure, in the case where various operations/processing according to the present disclosure are implemented by software and/or firmware, a program constituting the software can be installed from a storage medium or a network to a computer system having a dedicated hardware structure, for example, a computer system of an electronic device 700 shown in FIG. 7, which when having thereon installed the various programs, is capable of performing various functions including functions such as those described above, and the like.

In FIG. 7, a central processing unit (CPU) 701 executes various processes according to a program stored in a read-only memory (ROM) 702 or a program loaded from a storage portion 708 to a random access memory (RAM) 703. In the RAM 703, data required when the CPU 701 executes the various processes and the like is also stored as needed. The central processing unit is merely exemplary and can also be another type of processor, such as the various processors described above. The ROM 702, RAM 703, and storage portion 708 can be various forms of non-transitory computer-readable storage media, as described below. It should be noted that although the ROM 702, RAM 703, and storage portion 708 are shown separately in FIG. 7, one or more of them can be combined or located in a same memory or storage module or different memories or storage modules.

The CPU 701, ROM 702, and RAM 703 are connected to each other via a bus 704. An input/output interface 705 is also connected to the bus 704.

The following components are connected to the input/output interface 705: an input portion 706 such as a touch screen, a touch pad, a keyboard, a mouse, an image sensor, a microphone, an accelerometer, a gyroscope, or the like; an output portion 707 including a display such as a cathode ray tube (CRT), a liquid crystal display (LCD), a speaker, a vibrator, and the like; a storage portion 708 including a hard disk, a magnetic tape, and the like; and a communication portion 709 including a network interface card such as a LAN card, a modem, and the like. The communication portion 709 allows communication processing to be performed via a network such as the Internet. It is readily appreciated that while the various devices or modules in the electronic device 700 are shown in FIG. 7 communicate through the bus 704, they can also communicate through a network or other means, wherein the network can comprise a wireless network, a wired network, and/or any combination of wireless and wired networks.

A driver 710 is also connected to the input/output interface 705 as needed. A removable medium 711 such as a magnetic disk, an optical disk, a magneto-optical disk, a semiconductor memory, or the like is mounted on the drive 710 as needed, so that a computer program read out therefrom is installed in the storage portion 708 as needed.

In the case where the above series of processing is realized by software, a program constituting the software can be installed from a network such as the Internet or a storage medium such as the removable medium 711.

According to an embodiment of the present disclosure, a process described above with reference to a flow diagram can be implemented as a computer software program. For example, in the embodiment of the present disclosure, a computer program product is comprised, which comprises a computer program carried on a computer-readable medium, the computer program comprising program code for performing the method illustrated by the flow diagram. In such an embodiment, the computer program can be downloaded and installed from a network via the communication device 709, or installed from the storage portion 708, or installed from the ROM 702. The computer program, when executed by the CPU 701, performs the above functions defined in the method of the embodiment of the present disclosure.

It should be noted that in the context of this disclosure, the computer-readable medium can be tangible medium that can have thereon contained or stored a program for use by or in conjunction with an instruction execution system, apparatus, or device. The computer-readable medium can be a computer-readable signal medium or a non-transitory computer-readable storage medium or any combination of the two. The non-transitory computer-readable storage medium can be, for example, but is not limited to: an electronic, magnetic, optical, electromagnetic, infrared, or semiconductor system, apparatus, or device, or any combination of the above. More specific examples of the non-transitory computer-readable storage medium can comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the non-transitory computer-readable storage medium can be any tangible medium that has thereon contained or stored a program for use by or in conjunction with an instruction execution system, apparatus, or device. However, in the present disclosure, the computer-readable signal medium can comprise a data signal propagated in baseband or as part of a carrier wave, in which computer-readable program code is carried. Such a propagated data signal can take any of a variety of forms, including but not limited to, an electro-magnetic signal, an optical signal, or any suitable combination of the above. The computer-readable signal medium can also be any computer-readable medium other than the non-transitory computer-readable storage medium, and can send, propagate, or transmit a program for use by or in conjunction with an instruction execution system, apparatus, or device. The program code contained on the computer-readable medium can be transmitted using any suitable medium, including but not limited to: a wire, optical cable, RF (Radio Frequency), etc., or any suitable combination of the above.

The computer-readable medium can be included in the electronic device; can also be separate and not assembled into the electronic device.

In some embodiments, there is also provided a computer program, comprising: instructions which, when executed by a processor, cause the processor to perform the method of any of the embodiments described above. For example, the instructions can be embodied as computer program code.

In the embodiment of the present disclosure, computer program code for performing operations of the present disclosure can be written in one or more programming languages or any combination thereof, the programming language including but not limited to an object-oriented programming language such as Java, Smalltalk, C++, also including a conventional procedural programming language such as a "C" programming language or a similar programming language. The program code can be executed entirely on a user's computer, partly on the user's computer, as a stand-alone software package, partly on the user's computer and partly on a remote computer, or entirely on the remote computer or server. In a scenario where the remote computer is involved, the remote computer can be connected to the user's computer through any type of network, including a local area network (LAN) or a wide area network (WAN), or can be connected to an external computer (for example, through the Internet using an Internet service provider).

Flow diagrams and block diagrams in the drawings illustrate the possible architecture, functions, and operations of systems, methods and computer program products according to various embodiments of the present disclosure. In this regard, each block in the flow diagram or block diagram can represent one module, program segment, or portion of code, which comprises one or more executable instructions for implementing specified logical functions. It should also be noted that, in some alternative implementations, the functions noted in the blocks can also occur in a different order from the order noted in the drawings. For example, two blocks shown in succession can, in fact, be executed substantially in parallel, or they can sometimes be executed in the reverse order, which depends upon the functions involved. It will also be noted that each block in the block diagrams and/or flow diagrams, and a combination of the blocks in the block diagrams and/or flow diagrams, can be implemented by a special-purpose hardware-based system that performs the specified functions or operations, or a combination of special-purpose hardware and computer instructions.

A involved module, component or unit described in an embodiment of the present disclosure can be implemented by software or hardware. A name of the module, component, or unit does not in some cases constitute a limitation on the module, component, or unit itself.

The functions described above herein can be performed, at least in part, by one or more hardware logic components. For example, without limitation, exemplary hardware logic components that can be used comprise: a field programmable gate array (FPGA), application specific integrated circuit (ASIC), application specific standard product (ASSP), system on chip (SOC), complex programmable logic device (CPLD), and the like.

The above description is only some of the embodiments of the present disclosure and an explanation of applied technical principles. It should be appreciated by those skilled in the art that the disclosure scope involved in the present disclosure is not limited to a technical solution formed by a specific combination of the above features, but also encompasses another technical solution formed by an arbitrary combination of the above features or their equivalent features without departing from the above disclosure concepts. For example, it is a technical solution formed by replacing the above features with technical features having functions similar to the disclosed (but not limited to) in the present disclosure.

In the description provided herein, numerous specific details are set forth. However, it is understood that embodiments of this invention can be implemented without these specific details. In other cases, well-known methods, structures and techniques have not been presented in detail in order not to obscure the understanding of this description.

Furthermore, while the operations are depicted in a specific order, this should not be understood as requiring that these operations be performed in the specific order shown or in a sequential order. Under certain circumstances, multi-tasking and parallel processing can be advantageous. Similarly, while several specific implementation details are included in the above discussion, these should not be construed as limitations on the scope of the present disclosure. Certain features described in the context of separate embodiments can also be implemented in combination in a single embodiment. Conversely, various features described in the context of a single embodiment can also be implemented in multiple embodiments separately or in any suitable sub-combination.

Although some specific embodiments of the present disclosure have been described in detail by way of examples, it should be understood by those skilled in the art that the above examples are for illustration only and are not intended to limit the scope of the present disclosure. It should be appreciated by those skilled in the art that modifications can be made to the above embodiments without departing from the scope and spirit of the present disclosure. The scope of the present disclosure is defined by the attached claims.

What is claimed is:

1. A video processing method, comprising:
   providing an interactive interface comprising a specific shooting mode for a user, in response to a shooting request of the user;
   presenting a plurality of recommended videos to the user on a specific shooting mode interface, in response to the user's selection of the specific shooting mode on the interactive interface; and
   performing a specific shooting in response to a request inputted by the user associated with one of the plurality of recommended videos, wherein the specific shooting comprises acquiring a video and fusing the acquired video and the one recommended video or a related source video into a combined video.

2. The video processing method according to claim 1, wherein the specific shooting mode and a normal video shooting mode are provided on the interactive interface.

3. The video processing method according to claim 1, wherein the presenting the plurality of recommended videos from specific shooting to the user on the specific shooting mode interface comprises:
   concurrently presenting thumbnails of the plurality of recommended videos to the user; or
   sequentially presenting the plurality of recommended videos to the user.

4. The video processing method according to claim 1, wherein the presenting a plurality of recommended videos to the user on a specific shooting mode interface comprises:
   ranking videos in a database according to a user behavior; and
   presenting the plurality of recommended videos to the user according to a ranking result.

5. The video processing method according to claim 4, wherein the presenting a plurality of recommended videos to the user on a specific shooting mode interface comprises:
   ranking the videos according to a related publish number or according to a number of times the videos are played; and
   presenting the plurality of recommended videos to the user according to the ranking result.

6. The video processing method according to claim 4, wherein the presenting a plurality of recommended videos to the user on a specific shooting mode interface comprises:
   ranking original videos according to times subjected to specific shooting; and
   presenting the original videos as the recommended videos according to a ranking result, or for each original video ranked on top, presenting one or more videos from specific shooting with a number of times the videos are played greater than a threshold among videos from specific shooting corresponding to the original video to the user.

7. The video processing method according to claim 4, wherein the videos in the database meet at least one of:
creation time being within a specified period of time;
a number of times the videos are played being greater than a threshold; or
the video being "visible to everyone" and allowing everyone to perform a specific shooting with.

8. The video processing method according to claim 7, wherein the threshold is determined according to statistics of a number of videos and a number of times the videos are played in different regions.

9. The video processing method according to claim 4, wherein the ranking is performed according to at least one of creation time or creation place.

10. The video processing method according to claim 4, wherein the presenting a plurality of recommended videos ranked on top to the user according to a ranking result comprises:
presenting only recommended videos ranked on top within a specified period of time according to creation time.

11. The video processing method according to claim 1, wherein the presenting a plurality of recommended videos to the user on a specific shooting mode interface comprises:
displaying, on each recommended video, a tag related to a publish number by specific shooting.

12. The video processing method according to claim 1, wherein the performing the specific shooting in response to the request inputted by the user associated with one of the plurality of recommended videos comprises:
in response to a request inputted by the user based on the related source video related to a selected recommended video, performing the specific shooting with the related source video; or
performing the specific shooting with the related source video in response to the request inputted by the user based on the selected recommended video; or
performing a specific shooting with the selected recommended video in response to the request inputted by the user based on the selected recommended video, wherein the specific shooting comprises acquiring a video and fusing the acquired video and the one recommended video or a related source video into a combined video.

13. A video processing apparatus, comprising:
a display configured to
provide an interactive interface comprising a specific shooting mode for a user, in response to a shooting request of the user, and
present a plurality of recommended videos to the user on a specific shooting mode interface in response to the user's selection of the specific shooting mode on the interactive interface; and
a processor configured to perform a specific shooting in response to a request inputted by the user associated with one of the plurality of recommended videos from specific shooting, wherein the specific shooting comprises acquiring a video and fusing the acquired video and the one recommended video or a related source video into a combined video.

14. A video processing apparatus, comprising:
a memory; and
a processor coupled to the memory, the processor being configured to perform, based on instructions stored in the memory, a video processing method, comprising:
providing an interactive interface comprising a specific shooting mode for a user, in response to a shooting request of the user;
presenting a plurality of recommended videos to the user on a specific shooting mode interface, in response to the user's selection of the specific shooting mode on the interactive interface; and
performing a specific shooting in response to a inputted by the user associated with one of the plurality of recommended videos from specific shooting, wherein the specific shooting comprises acquiring a video and fusing the acquired video and the one recommended video or a related source video into a combined video.

15. The video processing apparatus according to claim 14, wherein a specific shooting mode and a Normal video shooting mode are comprised on the interactive interface.

16. The video processing apparatus according to claim 14, wherein the presenting a plurality of recommended videos to the user on a specific shooting mode interface comprises:
concurrently presenting thumbnails of the plurality of recommended videos to the user; or
sequentially presenting the plurality of recommended videos to the user.

17. A non-transitory computer-readable storage medium having thereon stored a computer program which, when executed by a processor, performs the video processing method according to claim 1.

* * * * *